United States Patent
Michal et al.

(10) Patent No.: US 9,502,972 B1
(45) Date of Patent: Nov. 22, 2016

(54) CHARGE-PUMP DEVICE WITH REDUCED CROSS-CONDUCTION LOSSES

(71) Applicant: STMicroelectronics (Alps) SAS, Grenoble (FR)

(72) Inventors: Vratislav Michal, Grenoble (FR); Denis Cottin, Crolles (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 0 days.

(21) Appl. No.: 14/959,048

(22) Filed: Dec. 4, 2015

(30) Foreign Application Priority Data

May 22, 2015 (FR) ...................................... 15 54607

(51) Int. Cl.
*H02M 3/07* (2006.01)

(52) U.S. Cl.
CPC ...................................... *H02M 3/07* (2013.01)

(58) Field of Classification Search
None
See application file for complete search history.

(56) References Cited

U.S. PATENT DOCUMENTS

| 4,298,926 | A | * | 11/1981 | Black | H02M 7/103 331/113 R |
|---|---|---|---|---|---|
| 4,716,512 | A | * | 12/1987 | Takamura | H02M 7/103 363/61 |
| 7,050,539 | B2 | * | 5/2006 | Loef | H02M 3/285 363/15 |
| 7,944,719 | B2 | * | 5/2011 | Luerkens | H05G 1/12 363/59 |
| 8,045,947 | B2 | * | 10/2011 | Mandal | H01Q 1/22 455/299 |
| 8,462,525 | B2 | * | 6/2013 | Drummond | H02M 3/28 363/60 |
| 8,816,653 | B2 | * | 8/2014 | Nuebling | H02M 1/08 323/222 |
| 8,860,396 | B2 | * | 10/2014 | Giuliano | H02M 3/07 323/266 |
| 2009/0140795 | A1 | | 6/2009 | Choy | |
| 2010/0245327 | A1 | | 9/2010 | Tsujino et al. | |

(Continued)

FOREIGN PATENT DOCUMENTS

FR  2864272 A1  6/2005

OTHER PUBLICATIONS

INPI Search Report and Written Opinion for FR 1554607 dated Apr. 15, 2016 (16 pages).

(Continued)

*Primary Examiner* — Thomas J Hiltunen
(74) *Attorney, Agent, or Firm* — Gardere Wynne Sewell LLP

(57) ABSTRACT

A charge-pump device receives two complementary driving signals and a DC signal that are applied to a charge-pump stage containing a full-wave rectifier bridge configured to deliver a DC output signal. The bridge includes active switches controllable by control signals present at two control nodes. The charge-pump device further receives complementary auxiliary signals that are respectively synchronous with the complementary driving signals but have faster edges. Two resistive capacitive filters filter the complementary auxiliary signals to generate control signals at the two control nodes for controlling actuation of the active switches in the bridge.

14 Claims, 6 Drawing Sheets

(56) References Cited

U.S. PATENT DOCUMENTS

2015/0333534 A1* 11/2015 Liu .................. H02J 5/005
                                                      307/104

OTHER PUBLICATIONS

Richard, Jean-Francois et al: "High Voltage Charge Pump Using Standard CMOS Technology," 2004 IEEE, Regular Session G, pp. 317-320.
Hong, David S. et al: "Low Operating Voltage and Short Settling Time CMOS Charge Pump for MEMS Applications," 2003 IEEE, pp. V-281-V-284.
Emira, Ahmed et al: "All-pMOS 50-V Charge Pumps Using Low-Voltage Capacitors," IEEE Transactions on Industrial Electronics, vol. 60, No. 10, Oct. 2013, pp. 4683-4693.

* cited by examiner

CHARGE-PUMP DEVICE WITH REDUCED CROSS-CONDUCTION LOSSES

PRIORITY CLAIM

This application claims priority from French Application for Patent No. 1554607 filed May 22, 2015, the disclosure of which is incorporated by reference.

TECHNICAL FIELD

Embodiments of the invention relate to charge-pump devices, especially integrated charge-pump devices, in particular dual-phase charge pump devices having active switches and low voltage high density capacitors, and having, for example, a high 18 Volt output voltage and an output current ranging up to 280 µA.

A non-limiting application is, for example, a quadrature/frequency compensation of a 3-axis vibratory MEMS (Micro ElectroMechanical System) gyroscope.

BACKGROUND

Traditional charge pumps provide an integer multiple of the input alternating current (AC) voltage Vin (usually square-wave). A popular approach used to integrate the charge pumps relies on the silicon PN or Schottky barrier diodes voltage multiplier. Its two-phase variant is shown in FIG. 1. In fact, this circuit realizes a full-wave rectification and multiplication of two complementary inputs Vin and –Vin. In FIG. 1, the first direct current (DC) node Vin is delivered by the DC voltage Vin directly.

The main advantage of this configuration is the operation with two complementary phases. This decreases the output voltage ripple and allows for a decrease in the total capacitor area. In fact, the output node is continuously supplied by one of the top or bottom floating capacitors resulting in double output ripple frequency.

The low-value middle capacitors $C_{MID}$ are used only to filter the spikes during the phase transitions.

On the other hand, the operation of this charge pump involves the use of two serially connected diodes $D_1$, $D_2$ per stage that decreases the conversion efficiency.

When several multiplication stages are used, the diode voltage drops are multiplied accordingly.

Solutions with diode-connected MOS transistors replacing the passive diodes are encountered mainly for Dickson type charge pumps requiring, however, high-voltage capacitors. Such a Dickson type charge-pump is, for example, disclosed in the article of D. S. Hong, M. El-Gamal, "Low operating voltage and short settling time CMOS charge pump for MEMS applications," in Proceeding of Circuits and Systems, 2003. ISCAS 2003 (incorporated by reference).

A solution allowing the implementation of active switches for a topology such as the one illustrated in FIG. 1, is disclosed in the article of A. Emira et al. "All-pMOS 50-V charge pump using low voltage capacitors," IEEE Transactions on Industrial Electronics, Vol. 60, No. 10, 2013 (incorporated by reference).

This solution is based on an active level shifter chain that provides fast control signals for transistors' gates. In this solution, the level shifter chain is connected in parallel with the main charge pump. However, the complication in such design is to create reliable isolated (floating) level shifters operating at high voltage. This design approach is difficult namely because the high operation voltages (>10V) which requires careful N-well and P-well isolation and post-layout verification of the level shifters.

Another solution using active switches, such as MOS transistors, in a charge-pump is a Pelliconi cascade charge-pump architecture disclosed in the article of J-F. Richard, Y. Savaria, "High voltage charge pump using standard CMOS technology," in Proceeding of Circuits and Systems, NEWCAS 2004 (incorporated by reference), in which the MOS transistors of the charge-pump stage are controlled by signals present at two control nodes of the charge-pump stage.

However, the use of these control signals can lead to an internal lock of the charge-pump due to the short cross-conduction of the complementary switches. This occurs namely for switches with very-low $R_{ON}$. Indeed, during the transitions of the clock signals, complementary MOS transistors may be turned-on simultaneously. And the simultaneous conduction of complementary switches slows the fall/rise edges of the signal, resulting in the discharge of the capacitors during the phase transitions.

SUMMARY

According to an embodiment, a charge-pump with active switches controllable by signal present at control nodes of the charge-pump is proposed which limits the risk of short cross-conduction of complementary switches.

According to another embodiment a charge-pump with active switches controllable by signal present at control nodes of the charge-pump is proposed which increases the output current driving capability.

According to an aspect a charge-pump device is proposed, comprising two main inputs for receiving two complementary driving signals, a DC input for receiving a DC signal and at least one charge-pump stage configured to perform a full-wave rectification and multiplication of the two complementary driving signals and to deliver a DC output signal and including active switches controllable by control signals present at two control nodes of said at least one charge-pump.

According to this aspect, said at least one charge-pump stage further comprises first and second auxiliary inputs for respectively receiving first and second complementary auxiliary signals respectively synchronous with said two complementary driving signals and having faster edges than those of said driving signals, and two resistive capacitive (RC) filters respectively connected between said first and second auxiliary inputs and said full-wave rectifier and respectively including said two control nodes.

Thus, according to this aspect, the control nodes are isolated by passive RC filters, each of which forming a high frequency bypass for the corresponding auxiliary signal and a low-pass DC path for the DC voltage in the nodes of said full-wave rectifier bridge. And, while the two complementary driving signals provide the output power, the complementary auxiliary signals are only used to drive the control electrode of the switches, for example the transistors gates, and can be low power signals. Thus, those low power signals can exhibit faster edges reducing thus the cross-conduction losses.

The capacitance of each auxiliary capacitor is advantageously greater than the capacitance of the control electrodes of the active switches and the product of said auxiliary capacitor capacitance by the resistive value of the corresponding resistor is advantageously greater than the duration of edges of said complementary driving signals.

According to an embodiment, said full-wave rectifier bridge has a first terminal connected to said DC input, a second terminal for delivering said DC output signal, and third and fourth terminals respectively connected to said two main inputs by two main capacitors, and said two resistive capacitive filters comprise:

a first resistive capacitive filter including a first auxiliary capacitor connected to said first auxiliary input and a first resistor connected between said first auxiliary capacitor and said third auxiliary terminal, the common node to said first auxiliary resistor and said first auxiliary capacitor forming a first control node, and a second resistive capacitive filter including a second auxiliary capacitor connected to said second auxiliary input and a second resistor connected between said second auxiliary capacitor and said fourth terminal, the common node to said second auxiliary resistor and said second auxiliary capacitor forming a second control node.

Although said active switches could comprise JFET transistors, said active switches preferably comprise NMOS transistors and PMOS transistors.

According to an embodiment, a first NMOS transistor is connected between said third terminal and said first terminal, a first PMOS transistor is connected between said third terminal and said first terminal, a second NMOS transistor is connected between said fourth terminal and said second terminal, a second PMOS transistor is connected between said fourth terminal and said second terminal, the gates of said first NMOS and PMOS transistors are connected to said second control node and the gates of said second NMOS and PMOS transistors are connected to said first control node.

According to an embodiment, the charge-pump device may comprise a chain of N serially connected charge-pump stages, each charge-pump stage having the same DC voltage gain, i.e., the voltage difference between the DC output signal and the DC input signal the charge-pump stage.

Although it would be possible that the main capacitors of all the charge-pump stages form two chains of serially connected main capacitors, it is preferable that the main capacitors of the charge-pump stages from the first one until the penultimate one in the chain be serially connected to form two chains of main capacitors, and the two main capacitors of the last charge-pump stage in the chain be respectively directly connected to said two main inputs.

Thus, the main capacitors of each chain are bypassed by the corresponding main capacitor of the last stage. This allows, in particular, to considerably increase the output current driving capability.

Such bypassing capacitors may be used independently of the use of the above mentioned isolating RC filters.

Thus, according to another aspect, a charge-pump device is proposed, comprising two main inputs for receiving two complementary driving signals, a DC input for receiving a DC signal a DC output for delivering a DC output signal and a chain of N charge-pump stages serially connected between said DC input and said DC output, each charge-pump stage having a same DC voltage gain and containing a full-wave rectifier bridge including active switches controllable by control signals present at two control nodes of said at least one charge-pump and two main capacitors; the main capacitors of the charge-pump stages from the first one until the penultimate in the chain are serially connected to form two chains of main capacitors connected to said two main inputs, and the two main capacitors of the last charge-pump stage in the chain are respectively directly connected to said two main inputs.

Whatever the aspect, the charge-pump device may be realized with discrete components or may an integrated charge-pump device.

BRIEF DESCRIPTION OF THE DRAWINGS

Other advantages and features of the invention will appear on examining the detailed description of embodiments, these being in no way limiting, and of the appended drawings in which.

DETAILED DESCRIPTION

Figure 1:
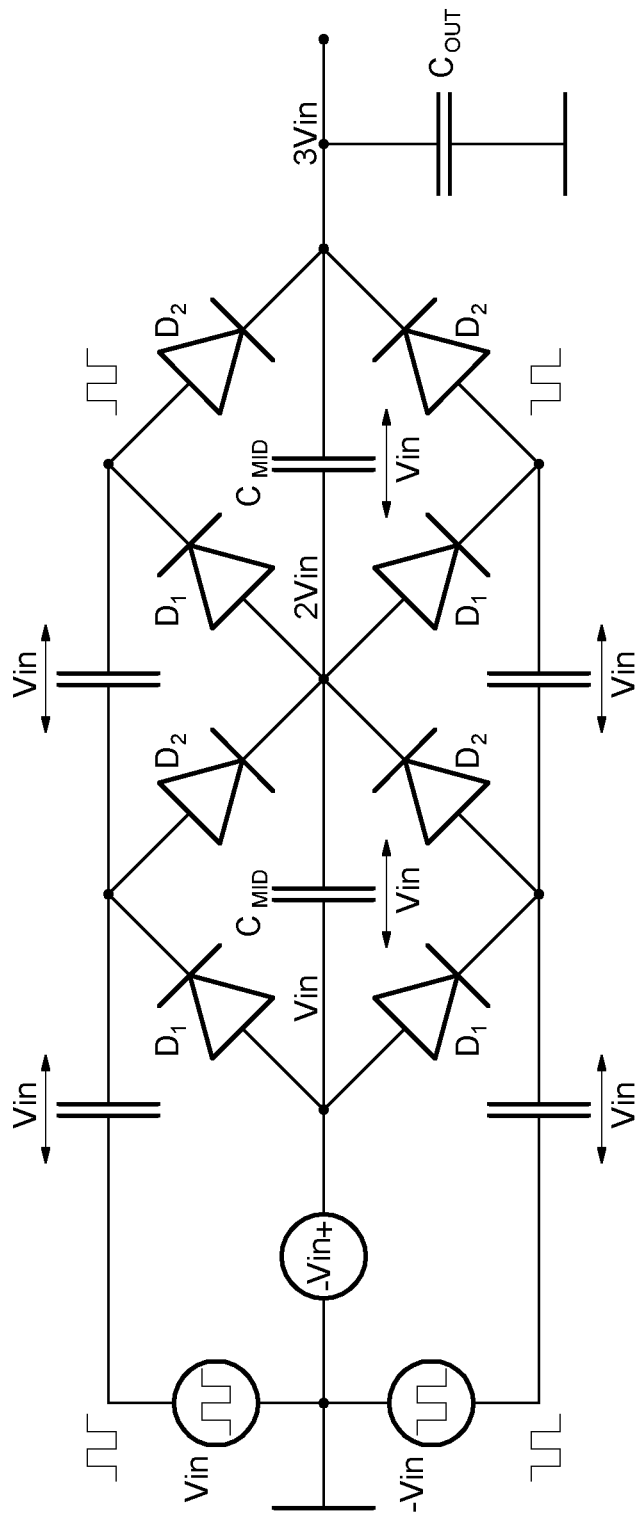
FIG. 1, already described, relates to an example of a charge-pump of the prior art.
Figure 2:
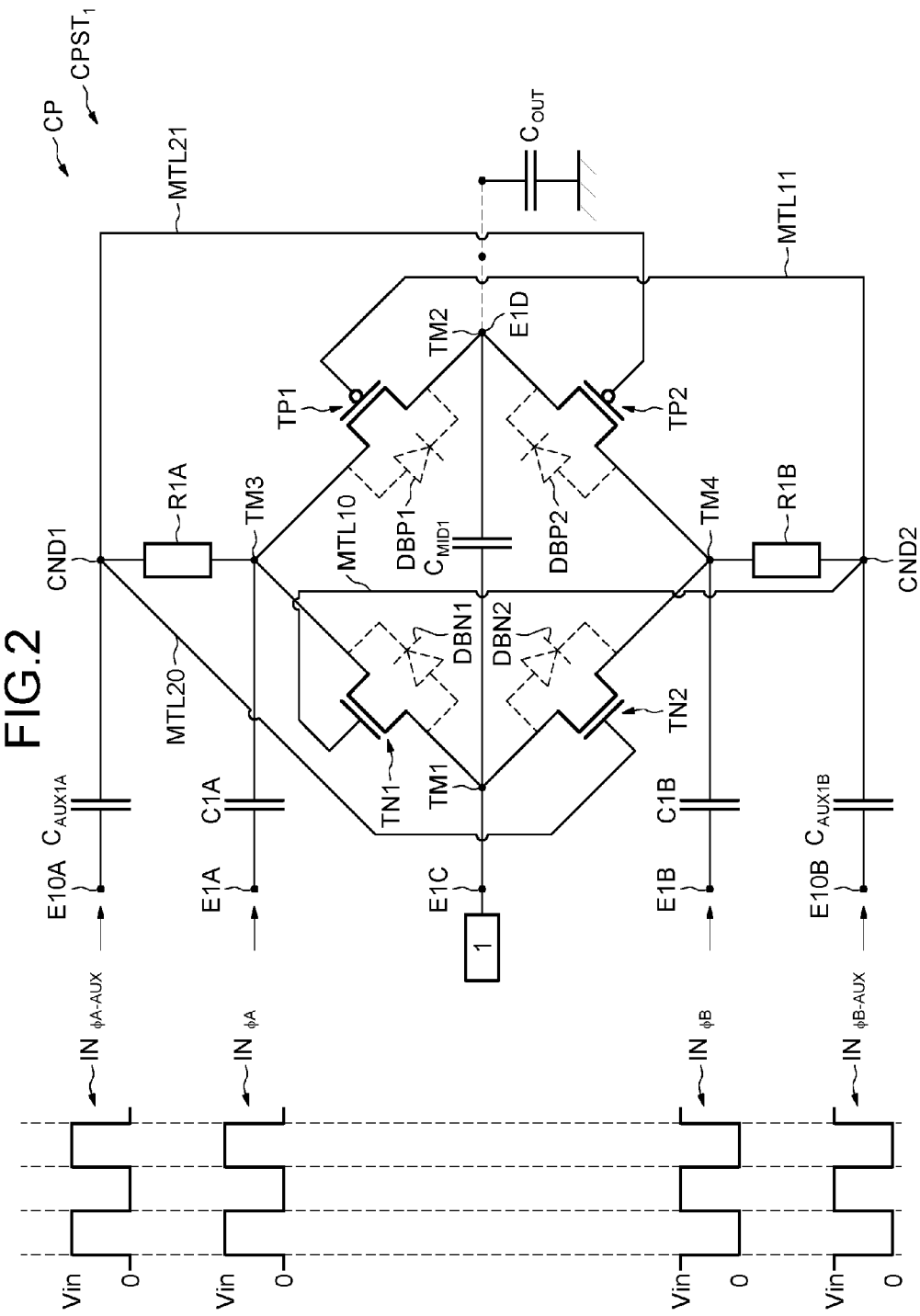
FIGS. 2-6 illustrate diagrammatically embodiments of the invention.

In FIG. 2, the reference CP designates a charge-pump device including one charge-pump stage $CPST_1$ in this embodiment.

The charge-pump device may be an integrated circuit or may be realized with discrete components.

The charge-pump device comprises two main inputs E1A, E1B for receiving two complementary driving signals $IN_{\Phi A}$, $IN_{\Phi B}$, here square-wave signals, and a DC input E1C for receiving a DC signal Vin from a voltage source 1 (for example, an external voltage source like a battery).

The charge-pump stage $CPST_1$ is configured to perform a full-wave rectification and multiplication of the two complementary driving signals $IN_{\Phi A}$, $IN_{\Phi B}$ and to deliver a DC output signal 2Vin at a DC output E1D connected to a high voltage output capacitor $C_{OUT}$.

The charge-pump stage $CPST_1$ includes active switches, here complementary MOS transistors TN1, TP1, TN2, TP2 controllable by control signals present at two control nodes CND1, CND2 of said charge-pump stage.

The charge-pump stage further comprises first and second auxiliary inputs E10A, E10B for respectively receiving first and second complementary auxiliary signals $IN_{\Phi A\text{-}AUX}$, $IN_{\Phi B\text{-}AUX}$ respectively synchronous with said two complementary driving signals $IN_{\Phi A}$, $IN_{\Phi B}$ and having faster edges (i.e., with a greater magnitude slope) than those of said driving signals $IN_{\Phi A}$, $IN_{\Phi B}$.

The charge-pump stage further comprises two resistive capacitive (RC) filters respectively connected between said first and second auxiliary inputs E10A, E10B and said full-wave rectifier and respectively including said two control nodes CND1, CND2.

The full-wave rectifier bridge has a first terminal TM1 connected to said DC input E1C, a second terminal TM2 for delivering said DC output signal and connected to said DC output E1D, and third and fourth terminals TM3, TM4 respectively connected to said two main inputs E1A, E1B by two main capacitors C1A, C1B.

The two resistive capacitive filters comprise a first resistive capacitive filter and a second resistive capacitive filter.

The first resistive capacitive filter includes a first auxiliary capacitor $C_{AUX1A}$ connected to said first auxiliary input E10A and a first resistor R1A connected between said first auxiliary capacitor $C_{AUX1A}$ and said third terminal TM3. The common node to said first auxiliary resistor R1A and said first auxiliary capacitor $C_{AUX1A}$ forms the first control node CND1.

The second resistive capacitive filter includes a second auxiliary capacitor $C_{AUX1B}$ connected to said second auxiliary input E10B and a second resistor R1B connected between said second auxiliary capacitor $C_{AUX1B}$ and said fourth terminal TM4. The common node to said second auxiliary resistor R1B and said second auxiliary capacitor $C_{AUX1B}$ forms the first control node CND2.

The active switches preferably comprise NMOS transistors and PMOS transistors.

More precisely, a first NMOS transistor TN1 is connected between said third terminal TM3 and said first terminal TM1, a first PMOS TP1 transistor is connected between said third terminal TM3 and said first terminal TM1, a second NMOS transistor TN2 is connected between said fourth terminal TM4 and said second terminal TM2, a second PMOS transistor TP2 is connected between said fourth terminal TM4 and said second terminal TM2.

The gates of said first NMOS and PMOS transistors TN1, TP1 are connected to said second control node CND2 through electrical connections, including for example metallic lines, MTL10, MTL11, and the gates of said second NMOS and PMOS transistors TN2, TP2 are connected to said first control node CND1 through electrical connections, including for example metallic lines, MTL20, MTL21.

Thus, the control nodes are isolated by the passive RC filters, each of which forming a high frequency bypass for the corresponding auxiliary signal $IN_{\Phi A-AUX}$ or $IN_{\Phi B-AUX}$ and a low-pass DC path for the DC voltage in the nodes of said full-wave rectifier bridge, in particular the nodes TM3 and TM4. And, as it will be explained more in detail herein, while the two complementary driving signals $IN_{\Phi A}$, $IN_{\Phi B}$ provide the output power, the complementary auxiliary signals $IN_{\Phi A-AUX}$, $IN_{\Phi B-AUX}$ are only used to drive the control electrode of the switches, for example the transistors gates, and can be low power signals. Thus, those low power signals can exhibit faster edges reducing thus the cross-conduction losses.

The capacitance of each auxiliary capacitor is advantageously greater and preferably much greater than the capacitance of the control electrodes of the active switches and the product of said auxiliary capacitor capacitance by the resistive value of the corresponding resistor is advantageously greater and preferably much greater than the edges (transitions) duration of said complementary driving signals.

For example, a MOS transistor may have a gate capacitance equal to one percent of the capacitance of each auxiliary capacitor, which may be equal to around 5 pF and the resistive value of the resistor may be equal to around 15 kilo-ohms.

The complementary driving signals are square-wave signals forming a clock signal having a frequency equal to 10 MHz and the edge duration of these complementary auxiliary signals $IN_{\Phi A-AUX}$, $IN_{\Phi B-AUX}$ is, for example, one nanosecond.

The edge duration of these complementary auxiliary signals $IN_{\Phi A-AUX}$, $IN_{\Phi B-AUX}$ is smaller than the edge duration of the complementary driving signals $IN_{\Phi A}$, $IN_{\Phi B}$ which can be up to several nanoseconds.

Figure 3:
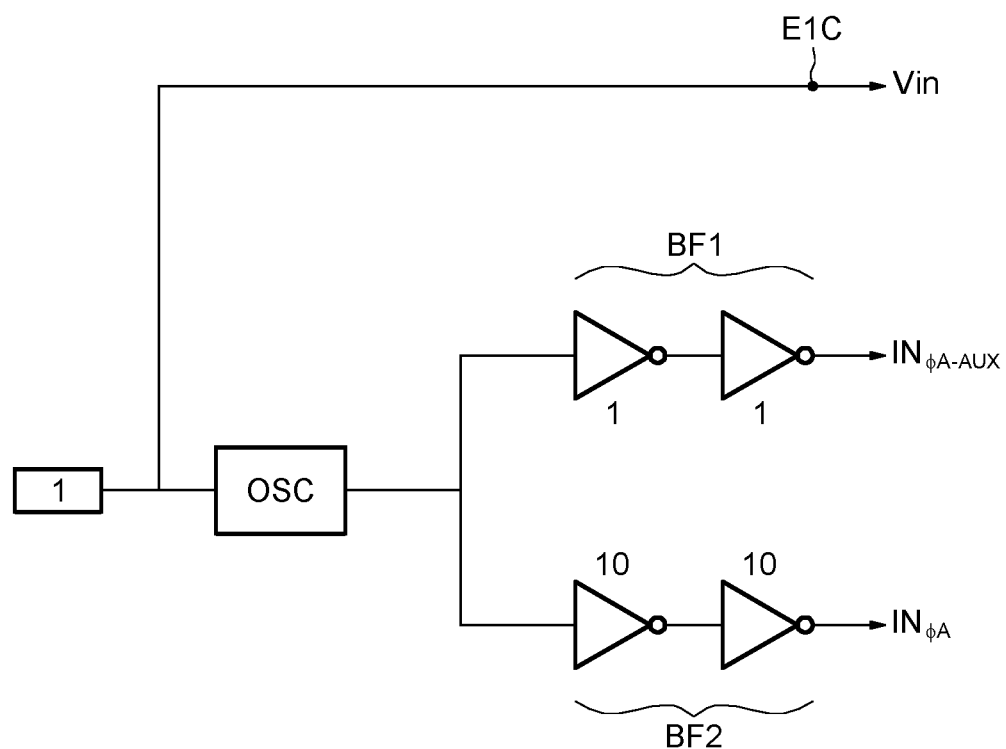

As illustrated in FIG. 3, a way for elaborating the complementary driving signals $IN_{\Phi A}$, $IN_{\Phi B}$ and the complementary auxiliary signals $IN_{\Phi A-AUX}$, $IN_{\Phi B-AUX}$ uses an oscillator OSC fed by the DC input signal Vin delivered by the battery 1.

The size of the buffers BF1 used for providing the complementary auxiliary signals is smaller than the size of the buffers BF2 used for providing the driving signal.

For example, a ratio of 1/10 may be used.

This is possible as the auxiliary signal $IN_{\Phi A-AUX}$, $IN_{\Phi B-AUX}$ are low power signals with respect to the driving signals $IN_{\Phi A}$, $IN_{\Phi B}$ used for providing the DC output.

Thus, the edges of the auxiliary signals are faster than the edges of the driving signals.

Figure 4:
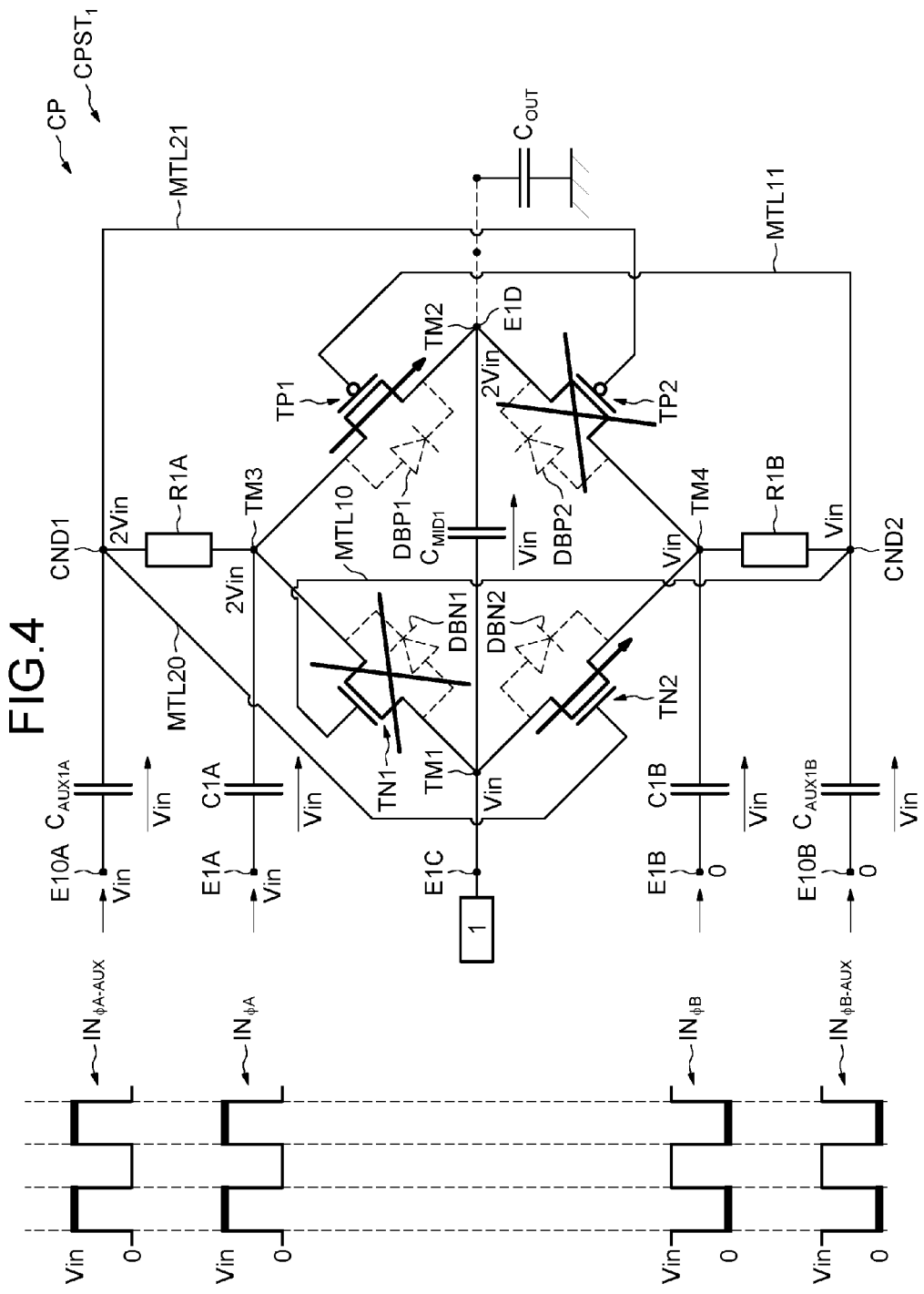
Figure 5:
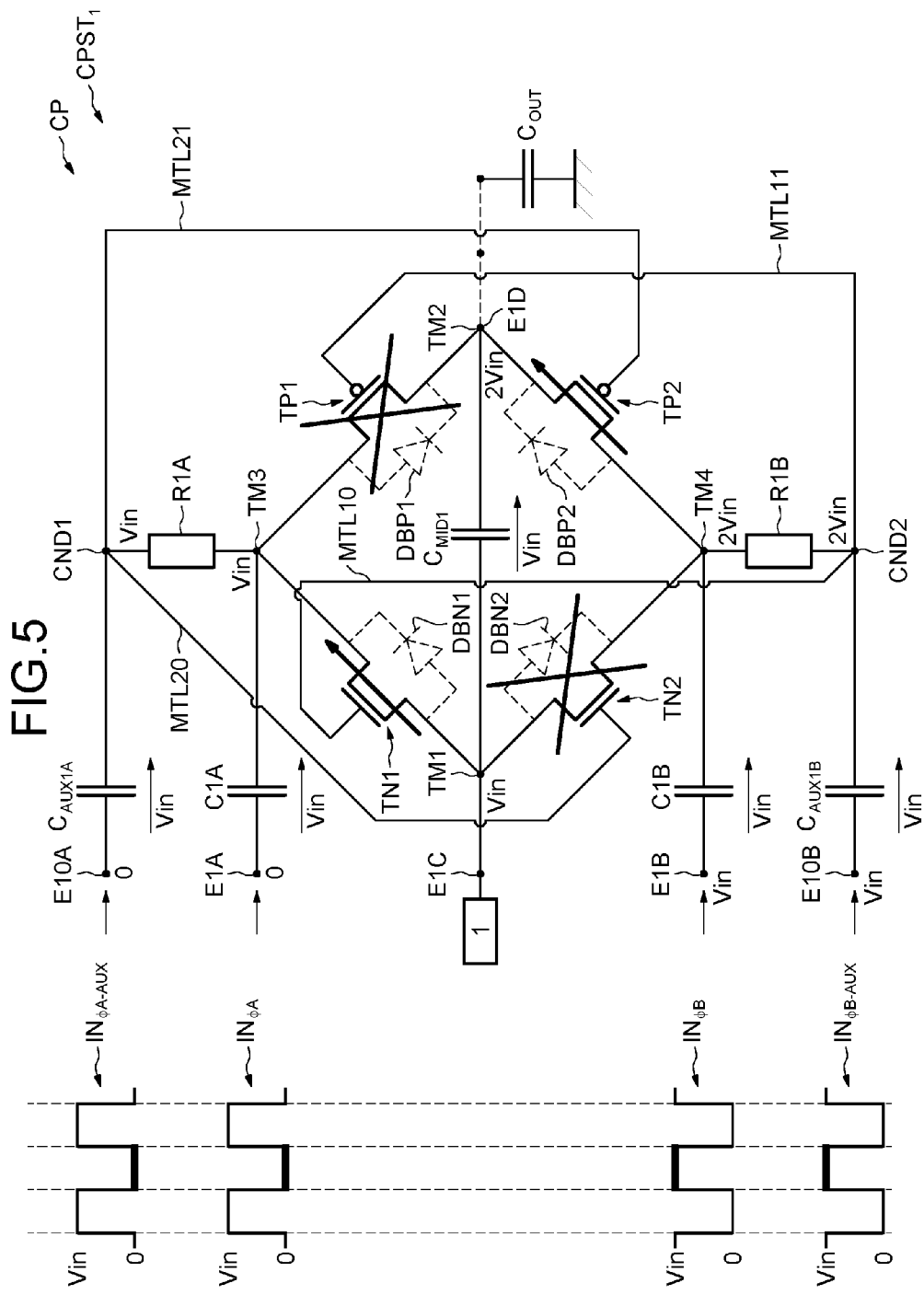

We refer now more particularly to FIGS. 4 and 5 which illustrate operations of the charge-pump stage $CPST_1$ in a steady state.

In FIG. 4, it is assumed that the driving signal $IN_{\Phi A}$ and the auxiliary signal $IN_{\Phi A-AUX}$ are in a high state having a value equal to Vin.

Consequently, the driving signal $IN_{\Phi B}$ and the auxiliary signal $IN_{\Phi B-AUX}$ are in a low state having a value equal to zero.

In a steady state, the voltage difference across the main capacitors C1A and C1B as well as across the secondary capacitor $C_{MID1}$ and across the auxiliary capacitors $C_{AUX1A}$ and $C_{AUX1B}$ are equal to Vin.

The voltage at main input E1A, auxiliary input E10A, first and fourth terminal TM1 and TM4, and at control node CND2 are equal to Vin.

The voltage at second and third terminals TM2, TM3 and at control node CND1 are equal to 2Vin.

The voltage at main input E1B and auxiliary input E10B are equal to zero.

Consequently, the first NMOS transistor TN1 and the second PMOS transistor TP2 are OFF while the second NMOS transistor TN2 and the first PMOS transistor TP1 are ON.

The first PMOS transistor TP1 in its "ON" state permits to obtain the voltage 2Vin at the output terminal TM2 (E1D).

The second NMOS transistor in its "ON" state permits to charge the main capacitor C1B by the voltage Vin.

FIG. 5 illustrates the configuration of the charge-pump stage $CPST_1$ when the driving signal $IN_{\Phi A}$ and the auxiliary signal $IN_{\Phi A-AUX}$ are in their low states while the complementary signals $IN_{\Phi B}$ and $IN_{\Phi B-AUX}$ are in their high states.

In this configuration, voltage Vin is present at control node CND1, main input E1B, auxiliary input E10B, first and third terminals TM1 and TM3.

Voltage 0 is present at main input E1A and auxiliary input E10A.

Voltage 2Vin is present at control node CND2, second and fourth terminals TM2, TM4.

Accordingly, the first NMOS transistor TN1 and the second PMOS transistor TP2 are in their "ON" state while the first PMOS transistor TP1 and the second NMOS transistor TN2 are in their "OFF" state.

The second PMOS transistor TP2 in its "ON" state permits to obtain voltage 2Vin at the output terminal TM2 (E1D) while the first NMOS transistor TN1 in its "ON" state permits to charge main capacitor C1A with voltage Vin.

It should be noted that during an initializing phase preceding the steady state, the drain-bulk diodes DBN1, DBP1, DBN2, DBP2, respectively associated with MOS transistors TN1, TP1, TN2 and TP2, functionally replace the MOS transistors themselves in order to establish the voltage difference Vin across all the capacitors, i.e. for arriving at the steady state.

As the voltage across all MOS transistors and capacitors does not exceed Vin, it is thus possible to advantageously use high density integrated metal-insulator-metal (MIM) capacitors with low breakdown voltage, in combination with active switches (MOS transistors). This enables to obtain high power density integration.

This allows also the transistors and capacitors to operate in sufficiently safe operating area.

Figure 6:
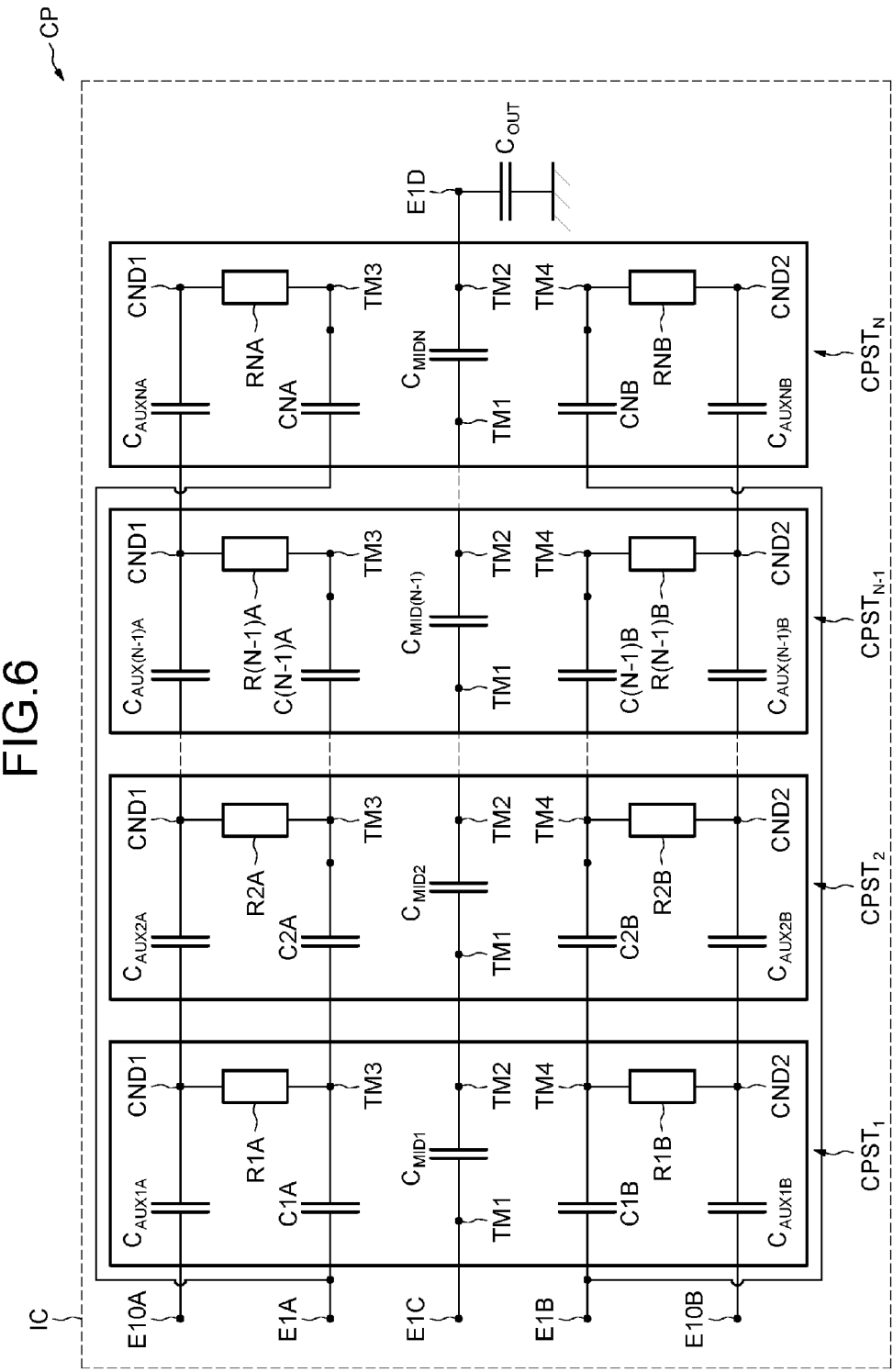

Generally speaking, the charge-pump device CP may comprise a chain of N serially connected charge-pump stages, as diagrammatically illustrated in FIG. 6, N being for example equal to 4.

Each charge-pump stage has here the same DC voltage gain, i.e. the difference between the DC output signal of the stage and the DC input signal of the stage.

If the DC input signal of the first stage is equal to Vin, the last charge-pump stage of the chain delivers a DC output signal being equal to (N+1)Vin.

Although it would be possible that the main capacitors C1A-CNA and C1B-CNB, of all the charge-pump stages form two chains of serially connected main capacitors, it is preferable, as illustrated in FIG. 6, that the main capacitors C1A-C(N−1)A, C1B-C(N−1)B of the charge-pump stages $CPST_1$-$CPST_{N-1}$ from the first one $CPST_1$ until the penultimate $CPST_{N-1}$ in the chain be serially connected to form two chains of main capacitors, and the two main capacitors CNA, CNB of the last charge-pump stage $CPST_N$ in the chain be respectively directly connected to the two main inputs E1A, E1B.

Of course, in such a case, the main capacitors CNA and CNB are high voltage capacitors. However, this allows to considerably increase the output current driving capability and also to efficiently use the three metals available under the high density MIM capacitors.

More precisely, for example, the main capacitors CNA and CNB may be made of several stacked metallic connections. This allows to efficiently use the area around the active switches and under the MIM capacitors which are physically placed over the upper metal layer.

As an example, whereas the main capacitors C1A-C(N−1)A and C1B-C(N−1)B are 5 volt MIM capacitors having capacitance varying from about 30 pF to 180 pF, the main capacitors CAN and CNB are 20 volt MOM (Metal-Oxide-Metal) capacitors.

The complementary driving signals $IN_{\Phi A}$, $IN_{\Phi B}$ and the complementary auxiliary signals $IN_{\Phi A-AUX}$, $IN_{\Phi B-AUX}$ may have for example a frequency of 10 MHz. And, such a 10 MHz charge-pump device may be integrated in a 0.13 micrometers CMOS process.

The invention is not limited to the above described embodiments.

For example, instead of having complementary driving signals and complementary auxiliary signals varying from 0 to Vin, it is possible to have signals varying from −Vin/2 to +Vin/2 with a DC input signal of the first charge-pump stage equal to 0.

The voltage source 1 may be replaced by for example an integrated input voltage doubler having two cross-coupled PMOS transistors and generating directly at node E1C a voltage equal to 2Vin leading thus to an output DC signal equal to 5Vin for the configuration illustrated in FIG. 6 with N=4.

It is thus possible to obtain from a DC input signal equal to 4.8 volts, a DC output signal equal to 18 volts with for example an output current ranging up to 280 microamperes.

It is also possible to add to the charge-pump device a feed-back control allowing generation of a constant output voltage.

Finally, the feature of the by-passing main capacitors CNA, CNB may be used without necessarily implementing the RC filters.

The invention claimed is:

1. A charge-pump device, comprising:
   two main inputs configured to receive two complementary driving signals,
   a direct current (DC) input configured to receive a DC signal; and
   at least one charge-pump stage comprising:
      a full-wave rectifier bridge connected to said two main inputs for delivering a DC output signal and including active switches controllable by control signals present at two control nodes of said at least one charge-pump stage,
      first and second auxiliary inputs configured to respectively receive first and second complementary auxiliary signals respectively synchronous with said two complementary driving signals and having faster edges than of said two complementary driving signals, and
      two resistive capacitive filters respectively connected between said first and second auxiliary inputs and said full-wave rectifier and respectively including said two control nodes.

2. The charge-pump device according to claim 1, wherein said full-wave rectifier bridge comprises:
   a first terminal connected to said DC input,
   a second terminal configured to deliver said DC output signal, and
   third and fourth terminals respectively connected to said two main inputs by two main capacitors, and
   wherein said two resistive capacitive filters comprise:
      a first resistive capacitive filter including a first auxiliary capacitor connected to said first auxiliary input and a first resistor connected between said first auxiliary capacitor and said third terminal, a common node to said first auxiliary resistor and said first auxiliary capacitor forming a first control node, and
      a second resistive capacitive filter including a second auxiliary capacitor connected to said second auxiliary input and a second resistor connected between said second auxiliary capacitor said fourth terminal, a common node to said second auxiliary resistor and said second auxiliary capacitor forming a second control node.

3. The charge-pump device according to claim 2,
   wherein a capacitance of each auxiliary capacitor is greater than a capacitance of the control electrodes of the active switches, and
   wherein a product of said auxiliary capacitor capacitance by a resistive value of the corresponding resistor is greater than an edge duration of said complementary driving signals.

4. The charge-pump device according to claim 1, wherein said active switches comprises NMOS transistors and PMOS transistors.

5. The charge-pump device according to claim 2, wherein a first NMOS transistor of the active switches is connected between said third terminal and said first terminal, a first PMOS transistor of the active switches is connected between said third terminal and said first terminal, a second NMOS transistor of the active switches is connected between said fourth terminal and said second terminal, a second PMOS transistor of the active switches is connected between said fourth terminal and said second terminal, and wherein gates of said first NMOS transistor and first PMOS transistor are connected to said second control node, and wherein gates of said second NMOS transistor and second PMOS transistor are connected to said first control node.

6. The charge-pump device according to claim 1, further comprising a chain of N serially connected charge-pump stages, each charge-pump stage having a same DC voltage gain.

7. The charge-pump device according to claim 6, wherein the main capacitors of the charge-pump stages from a first charge-pump stage in the chain until a penultimate charge-pump stage in the chain are serially connected to form two chains of main capacitors, and wherein the two main capacitors of a last charge-pump stage in the chain are respectively directly connected to said two main inputs.

8. The charge-pump device according to claim 1, being implemented as an integrated charge-pump device.

9. A charge-pump device, comprising:
   two main inputs configured to receive two complementary driving signals,
   a direct current (DC) input configured to receive a DC signal,
   a DC output configured to deliver a DC output signal, and
   a chain of N charge-pump stages serially connected between said DC input and said DC output,
   wherein each charge-pump stage has a same DC voltage gain and containing a full-wave rectifier bridge including active switches controllable by control signals present at two control nodes and two main capacitors,
   wherein the two main capacitors of each charge-pump stage from a first charge-pump stage until a penultimate charge-pump stage in the chain are serially connected to form two chains of main capacitors connected to said two main inputs, and
   wherein the two main capacitors of a last charge-pump stage in the chain are respectively directly connected to said two main inputs.

10. The charge-pump device according to claim 9, wherein said active switches comprises NMOS transistors and PMOS transistors.

11. The charge-pump device according to claim 9, being implemented as an integrated charge-pump device.

12. The charge-pump device according to claim 9, wherein each charge-pump stage further comprises:
   first and second auxiliary inputs configured to respectively receive first and second complementary auxiliary signals respectively synchronous with said two complementary driving signals and having faster edges than of said two complementary driving signals, and
   two resistive capacitive filters respectively connected between said first and second auxiliary inputs and said full-wave rectifier and respectively including said two control nodes.

13. The charge-pump device according to claim 12,
   wherein a capacitance of each auxiliary capacitor is greater than a capacitance of the control electrodes of the active switches, and
   wherein a product of said auxiliary capacitor capacitance by a resistive value of the corresponding resistor is greater than an edge duration of said complementary driving signals.

14. A charge-pump device, comprising:
   a first input configured to receive a first driving signal;
   a second input configured to receive a second driving signal complementary of the first driving signal;
   a third input configured to receive a first auxiliary signal that is in phase with the first driving signal but having a faster edge duration;
   a fourth input configured to receive a second auxiliary signal that is in phase with the second driving signal but having a faster edge duration;
   a fifth input configured to receive a direct current (DC) signal;
   a full-wave rectifier bridge comprising:
      a first MOS transistor coupled between a first bridge node and a third bridge node;
      a second MOS transistor coupled between the first bridge node and a fourth bridge node;
      a third MOS transistor coupled between the third bridge node and a second bridge node; and
      a fourth MOS transistor coupled between the second bridge node the fourth bridge node;
   a first capacitor coupled between the first and second bridge nodes;
   a circuit connecting the first bridge node to the fifth input;
   a second capacitor coupled between the first input and the third bridge node;
   a third capacitor coupled between the second input and the fourth bridge node;
   a first resistor coupled between the third bridge node and a first control node, said first control node coupled to a gate terminals of the second and fourth MOS transistors;
   a second resistor coupled between the fourth bridge node and a second control node, said second control node coupled to a gate terminals of the first and third MOS transistors;
   a fourth capacitor coupled between the third input and the first control node; and
   a fifth capacitor coupled between the fourth input and the second control node.

\* \* \* \* \*